US010439688B2

(12) United States Patent
Mochida et al.

(10) Patent No.: US 10,439,688 B2
(45) Date of Patent: Oct. 8, 2019

(54) RADIO COMMUNICATION DEVICE AND METHOD OF DETERMINING WEIGHTING MATRIX

(71) Applicant: SUMITOMO ELECTRIC INDUSTRIES, LTD., Osaka-shi, Osaka (JP)

(72) Inventors: Eiji Mochida, Osaka (JP); Hitoshi Hirata, Osaka (JP)

(73) Assignee: SUMITOMO ELECTRIC INDUSTRIES, LTD., Osaka-ski, Osaka (JP)

(*) Notice: Subject to any disclaimer, the term of this patent is extended or adjusted under 35 U.S.C. 154(b) by 16 days.

(21) Appl. No.: 15/525,615

(22) PCT Filed: Oct. 1, 2015

(86) PCT No.: PCT/JP2015/077976
§ 371 (c)(1),
(2) Date: May 10, 2017

(87) PCT Pub. No.: WO2016/080087
PCT Pub. Date: May 26, 2016

(65) Prior Publication Data
US 2018/0294853 A1    Oct. 11, 2018

(30) Foreign Application Priority Data

Nov. 20, 2014  (JP) .................................. 2014-235904
Apr. 30, 2015  (JP) .................................. 2015-093222

(51) Int. Cl.
*H04B 7/04*       (2017.01)
*H04B 7/0456*     (2017.01)
(Continued)

(52) U.S. Cl.
CPC .......... *H04B 7/0456* (2013.01); *H04B 7/0408* (2013.01); *H04B 7/0615* (2013.01)

(58) Field of Classification Search
CPC .......................... H04B 7/0456; H04B 7/0615
See application file for complete search history.

(56) References Cited

U.S. PATENT DOCUMENTS 9,960,883 B1 * 5/2018 Chakraborty ......... G06F 7/4876
2002/0150065 A1 * 10/2002 Ponnekanti .......... H04B 7/0617
370/334
(Continued)

FOREIGN PATENT DOCUMENTS

JP   2009-010968 A   1/2009
JP   2009-182403 A   8/2009
(Continued)

OTHER PUBLICATIONS

Revised Edition Wireless Broadband Textbook High-Speed IP Wireless Edition, written and edited by Hattori Takeshi and Fujioka Masanobu, Impress R&D, Jun. 21, 2006, p. 193, including English language translation.
(Continued)

*Primary Examiner* — Jean B Corrielus
(74) *Attorney, Agent, or Firm* — Drinker Biddle & Reath LLP

(57) ABSTRACT

A radio communication device includes: a baseband portion that generates a plurality of transmit signals destined for a same area; an antenna including a plurality of antenna elements; and a signal processing portion that splits each of the plurality of transmit signals generated by the baseband portion into signals for the respective plurality of antenna elements, multiplies each of the plurality of split transmit signals by a corresponding element of a weighting matrix,
(Continued)

and then combines those of the transmit signals provided for each corresponding antenna element.

7 Claims, 11 Drawing Sheets

(51) Int. Cl.
*H04B 7/06* (2006.01)
*H04B 7/0408* (2017.01)

(56) References Cited

U.S. PATENT DOCUMENTS

| | | | |
|---|---|---|---|
| 2003/0162566 A1* | 8/2003 | Shapira | H01Q 1/246 |
| | | | 455/561 |
| 2010/0062723 A1* | 3/2010 | Tao | H04B 7/0617 |
| | | | 455/67.11 |
| 2010/0183084 A1 | 7/2010 | Rietman | |
| 2011/0105032 A1 | 5/2011 | Maruhashi et al. | |
| 2016/0080051 A1* | 3/2016 | Sajadieh | H04B 7/0456 |
| | | | 375/267 |
| 2016/0119910 A1* | 4/2016 | Krzymien | H04B 7/0639 |
| | | | 370/329 |

FOREIGN PATENT DOCUMENTS

| | | |
|---|---|---|
| JP | 2010-529799 A | 8/2010 |
| JP | 2014-127876 A | 7/2014 |
| WO | WO-2010/007717 A1 | 1/2010 |
| WO | WO-2014/117748 A1 | 8/2014 |

OTHER PUBLICATIONS

Ping-Heng Kuo, et al., "Compressive Sensing Based Channel Feedback Protocols for Spatially-Correlated Massive Antenna Arrays," 2012 IEEE Wireless Communications and Networking Conference (WCNC), 2012 IEEE, Apr. 4, 2012, pp. 492-497.

Japanese Office Action dated Jan. 15, 2019 issued in Japanese patent application No. 2015-093222.

* cited by examiner

RADIO COMMUNICATION DEVICE AND METHOD OF DETERMINING WEIGHTING MATRIX

TECHNICAL FIELD

The present invention relates to a radio communication device and a method of determining a weighting matrix.

BACKGROUND ART

Multi-antenna techniques are techniques for improving communication capacity, frequency use efficiency, power consumption, etc., by performing transmission and reception using a plurality of antennas in radio communication. Note that even if the number of antennas is one on either the transmitting side or the receiving side, an improvement in communication quality, etc., can be achieved according to the number of antennas on the other side.

As a term related to such multi-antenna techniques, there is MIMO (Multiple Input Multiple Output). MIMO, when used as a communications term, often refers to a communication system where both the transmitting side and the receiving side use a plurality of antennas, but may be used referring to general multi-antenna techniques (see, for example, Non-Patent Literature 1).

There are the following four advantages to be obtained by a multi-antenna signal processing algorithm:

(1) Spatial diversity;
(2) Coherent gain;
(3) Interference mitigation; and
(4) Spatial multiplexing.

The spatial diversity refers to a reduction in degradation of communication quality caused by the influence of multipaths, etc., by the use of spatially separated antennas.

The coherent gain refers to an increase in the ratio between received power and noise in a desired direction by assigning weights using propagation path information (changes in amplitude and phase) to signals at the respective antennas on the receiving side and the transmitting side.

In the interference mitigation, receive signals from the respective antennas are weighted to cancel out incoming signals (interference signals) other than a desired signal, and combined. Interference signals smaller in number by one than the number of receive antennas can be removed. If the propagation factor of incoming signals is unknown, then some kind of learning algorithm needs to be used.

The spatial multiplexing is a method of simultaneously establishing a plurality of communication channels by applying the interference mitigation. There are a method in which communication capacity is increased by a single user transmitting different signals from a plurality of antennas, and a method in which frequency use efficiency is increased by a plurality of users simultaneously performing communication. The latter method is called SDMA (Space Division Multiple Access).

CITATION LIST

Non-Patent Literature

Non-Patent Literature 1: Revised Edition Wireless Broadband Textbook High-Speed IP Wireless Edition, written and edited by Hattori Takeshi and Fujioka Masanobu, Impress R&D, Jun. 21, 2006, p. 193

SUMMARY OF INVENTION

Technical Problem

In MIMO communication, for example, in order to transmit a plurality of baseband signals destined for the same sector, there is a need to install a plurality of antennas provided for the respective plurality of baseband signals. Hence, there are a problem that the beauty of a surrounding area is spoilt by the installation of a plurality of antennas at an antenna site and a problem that it becomes difficult to secure an antenna site itself where a plurality of antennas can be installed.

The present invention is made in view of such circumstances and an object of the present invention is therefore to allow a plurality of transmit signals destined for the same area to be transmitted by a smaller number of antennas than the number of the transmit signals.

Solution to Problem

A radio communication device according to one aspect of the present invention is a radio communication device including: a baseband portion that generates a plurality of transmit signals destined for a same area; an antenna including a plurality of antenna elements; and a signal processing portion that splits each of the plurality of transmit signals generated by the baseband portion into signals for the respective plurality of antenna elements, multiplies each of the plurality of split transmit signals by a corresponding element of a weighting matrix, and then combines those of the transmit signals provided for each corresponding antenna element.

A method of determining a weighting matrix according to another aspect of the present invention is a method of determining a weighting matrix to be multiplied to a plurality of transmit signals generated by a baseband portion and destined for a same area, the method including: a selecting step of selecting, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit signals generated by the baseband portion; and a determining step of determining, as the weight row vectors or the weight column vectors, weight candidates that satisfy desired communication quality from among the weight candidates selected in the selecting step.

Advantageous Effects of Invention

According to the present invention, a plurality of transmit signals destined for the same area can be transmitted by a smaller number of antennas than the number of the transmit signals.

DESCRIPTION OF EMBODIMENTS

Figure 1:
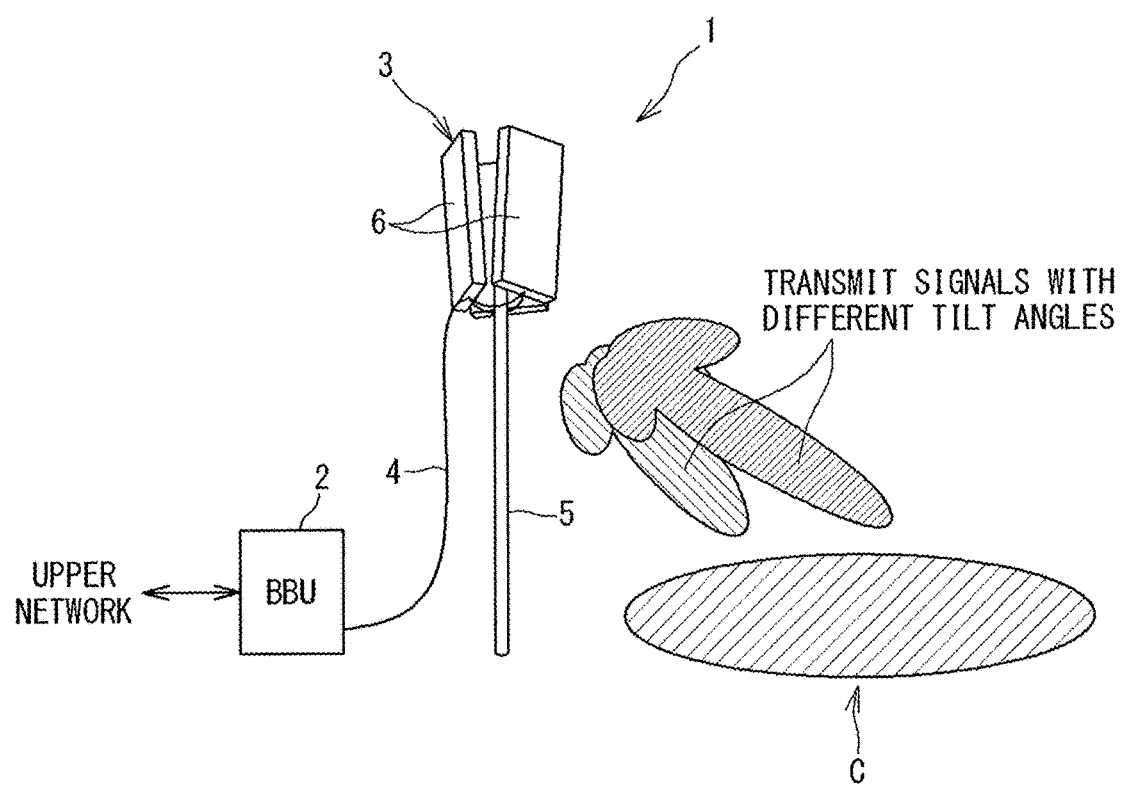
FIG. 1 is a diagram showing a radio communication device according to a first embodiment of the present invention.

Description of Embodiments of the Present Invention

First, the content of embodiments of the present invention will be listed and described.

(1) A radio communication device according to an embodiment of the present invention includes a baseband portion that generates a plurality of transmit signals destined for a same area; an antenna including a plurality of antenna elements; and a signal processing portion that splits each of the plurality of transmit signals generated by the baseband portion into signals for the respective plurality of antenna elements, multiplies each of the plurality of split transmit signals by a corresponding element of a weighting matrix, and then combines those of the transmit signals provided for each corresponding antenna element.

The term "area" used herein means an area which is a single sector or a single cell that is not divided into a plurality of sectors, and in which a mobile terminal that performs radio communication with the radio communication device can move around without handover.

According to the radio communication device, each of the plurality of transmit signals generated by the baseband portion and destined for the same area is split into signals for the respective plurality of antenna elements included in a single antenna, each of the plurality of split transmit signals is multiplied by a weighting matrix, and those of the transmit signals provided for each corresponding antenna element are combined. Hence, a plurality of transmit signals destined for the same area can be transmitted using a single antenna in a shared manner. As a result, the plurality of transmit signals destined for the same area can be transmitted by a smaller number of antennas than the number of the transmit signals.

(2) In the radio communication device, it is preferred that the signal processing portion include: a plurality of digital-analog converters, each converting a corresponding one of a plurality of digital transmit signals generated by the baseband portion to an analog transmit signal; a plurality of splitters, each splitting a corresponding one of the converted transmit signals into signals for the respective plurality of antenna elements; a plurality of phase shifters, each performing phase adjustment on a corresponding one of the split transmit signals, based on a corresponding element of the weighting matrix; and a plurality of combiners, each combining those of the phase-adjusted transmit signals provided for a corresponding one of the antenna elements, and the antenna further include a plurality of amplifiers, each amplifying corresponding transmit signals combined by a corresponding one of the combiners, and providing the amplified transmit signals to a corresponding one of the antenna elements.

In this case, the plurality of digital-analog converters are provided at a stage previous to the plurality of splitters. Hence, it is sufficient that the digital-analog converters be provided for the respective plurality of transmit signals destined for the same area. Accordingly, the number of digital-analog converters can be reduced over a case in which a digital-analog converter is provided for each of the plurality of antenna elements. As a result, a reduction in cost is possible.

In addition, since the phase shifters are provided at a stage previous to the amplifiers, pre-amplification transmit signals are provided to the phase shifters. Since the pre-amplification transmit signals are lower in power compared to post-amplification transmit signals, it becomes possible to use phase shifters whose handleable value of signal power is relatively small. By this, it becomes possible to use more compact, lower-cost phase shifters, enabling to achieve lower cost and miniaturization.

(3) In the radio communication device, the signal processing portion may include: a plurality of digital-analog converters, each converting a corresponding one of a plurality of digital transmit signals generated by the baseband portion to an analog transmit signal; a plurality of splitters, each splitting a corresponding one of the converted transmit signals into signals for the respective plurality of antenna elements; a plurality of phase shifters, each performing phase adjustment on a corresponding one of the split transmit signals, based on a corresponding element of the weighting matrix; and a plurality of combiners, each combining those of the phase-adjusted transmit signals provided for a corresponding one of the antenna elements, and the radio communication device may further include a plurality of amplifiers, each amplifying a corresponding one of the plurality of transmit signals, the plurality of amplifiers being provided on an earlier stage side than the antenna.

In this case, the plurality of digital-analog converters are provided on the earlier stage side than the plurality of splitters. Hence, it is sufficient that the digital-analog converters be provided for the respective plurality of transmit signals destined for the same area. Accordingly, the number of digital-analog converters can be reduced over a case in which a digital-analog converter is provided for each of the plurality of antenna elements. As a result, a reduction in cost is possible.

(4) In the radio communication device, the signal processing portion may be a digital signal processing portion that splits each of a plurality of digital transmit signals generated by the baseband portion into signals for the respective plurality of antenna elements, multiplies each of the plurality of split digital transmit signals by a corresponding element of the weighting matrix, and then combines those of the transmit signals provided for each corresponding antenna element, and the antenna may further include a plurality of amplifiers, each amplifying corresponding transmit signals combined by the digital signal processing portion, and providing the amplified transmit signals to a corresponding one of the antenna elements.

In this case, since signal processing ranging from the splitting to combining of transmit signals generated by the baseband portion can be performed by digital signal processing, high-level communication control can be performed compared to a case of performing the signal processing by analog signal processing.

(5) In the radio communication device, the signal processing portion may be a digital signal processing portion that splits each of a plurality of digital transmit signals generated by the baseband portion into signals for the respective plurality of antenna elements, multiplies each of the plurality of split digital transmit signals by a corresponding element of the weighting matrix, and then combines those of the transmit signals provided for each corresponding antenna element, and the radio communication device may further include a plurality of amplifiers, each amplifying a corresponding one of the plurality of transmit signals, the plurality of amplifiers being provided on an earlier stage side than the antenna.

In this case, since signal processing ranging from the splitting to combining of transmit signals generated by the baseband portion can be performed by digital signal processing, high-level communication control can be performed compared to a case of performing the signal processing by analog signal processing.

(6) In the radio communication device, it is preferred that in the weighting matrix, weight row vectors or weight column vectors be orthogonal to each other, the weight row vectors and the weight column vectors being provided for the respective plurality of transmit signals generated by the baseband portion.

The expression used herein that weight row vectors or weight column vectors are "orthogonal" to each other means that the sum of cross-correlations of two weight row vectors or weight column vectors is 0.

In this case, a cross-correlation of a plurality of transmit signals destined for the same area can be reduced.

(7) When the weighting matrix is generated based on a discrete Fourier transform matrix, there may be a case in which a mobile terminal that receives a plurality of transmit signals transmitted from a single antenna strongly receives only a specific transmit signal, depending on the receive location of the transmit signals. In this case, since variation occurs in power between the transmit signals, the effects of MIMO communication cannot be sufficiently exerted.

Hence, it is preferred that the weighting matrix be generated based on a discrete cosine transform matrix. In this case, the mobile terminal can receive a plurality of transmit signals transmitted from a single antenna in a good balance. By this, since there is no variation in power between a plurality of transmit signals when the mobile terminal receives the transmit signals, the effects of MIMO communication are more easily exerted compared to a case of generating the weighting matrix based on the discrete Fourier transform matrix.

(8) It is preferred that the radio communication device further include: a selecting portion that selects, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit signals generated by the baseband portion; and a determining portion that determines, as the weight row vectors or the weight column vectors, weight candidates that satisfy desired communication quality from among the weight candidates selected by the selecting portion.

In this case, the selecting portion selects, based on the tilt angles of beams to the area, multiple weight candidates which serve as candidates for weight row vectors or weight column vectors provided for the respective plurality of transmit signals generated by the baseband portion. Thus, the selecting portion can easily and promptly narrow down the weight candidates. In addition, since the determining portion determines, as the weight row vectors or weight column vectors, weight candidates that satisfy desired communication quality from among the multiple weight candidates, the desired communication quality can be obtained.

(9) It is preferred that the radio communication device further include: a selecting portion that selects, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit signals generated by the baseband portion; and a determining portion that determines, as the weight row vectors or the weight column vectors, weight candidates that satisfy desired communication quality from among the weight candidates selected by the selecting portion, and row vectors or column vectors of the discrete cosine transform matrix serve as the weight candidates to be selected by the selecting portion.

In this case, the selecting portion selects, based on the tilt angles of beams to the area, multiple weight candidates which serve as candidates for weight row vectors or weight column vectors provided for the respective plurality of transmit signals generated by the baseband portion. Thus, the selecting portion can easily and promptly narrow down the weight candidates. In addition, since the row vectors or column vectors of the discrete cosine transform matrix serve as weight candidates to be selected by the selecting portion, the weighting matrix can be easily generated based on the discrete cosine transform matrix. Furthermore, since the determining portion determines, as the weight row vectors or weight column vectors, weight candidates that satisfy desired communication quality from among the multiple weight candidates, the desired communication quality can be obtained.

(10) A method of determining a weighting matrix according to an embodiment of the present invention is a method of determining a weighting matrix to be multiplied to a plurality of transmit signals generated by a baseband portion and destined for a same area, the method including: a selecting step of selecting, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit signals generated by the baseband portion; and a determining step of determining, as the weight row vectors or the weight column vectors, weight candidates that satisfy desired communication quality from among the weight candidates selected in the selecting step.

According to the method of determining a weighting matrix, since in the selecting step, multiple weight candidates which serve as candidates for weight row vectors or weight column vectors provided for the respective plurality of transmit signals generated by the baseband portion are selected based on the tilt angles of beams to the area, the weight candidates can be easily and promptly narrowed down. In addition, since in the determining step, weight candidates that satisfy desired communication quality are determined from among the multiple weight candidates as the weight row vectors or weight column vectors, the desired communication quality can be obtained.

Details of the Embodiments of the Present Invention

The embodiments of the present invention will be described in detail below based on the accompanying drawings.

<For the Overall Configuration of a Radio Communication Device>

FIG. 1 is a diagram showing a radio communication device according to a first embodiment of the present invention. In the drawing, a radio communication device 1 is used as, for example, a base station device in a radio communication system for mobile phones to which LTE (Long Term Evolution) is applied. The radio communication device 1 has the function of performing radio communication with mobile terminals such as mobile phones (not shown).

As shown in FIG. 1, the radio communication device 1 includes a baseband unit (BBU) 2 which is a baseband portion; and an antenna system 3.

The baseband unit 2 is connected to the antenna system 3 by a signal transmission line (optical transmission line or electrical transmission line) 4 extending from the baseband unit 2.

The baseband unit 2 has the function of performing a digital modulation process on transmit data which is provided from an upper network, and generating a plurality of transmit baseband signals destined for the same cell C (described later) as digital signals.

The baseband unit 2 provides the transmit baseband signals (I/Q signals) which are obtained by modulating the transmit data, to the antenna system 3 through the signal transmission line 4.

In addition, the baseband unit 2 has the function of obtaining receive baseband signals (I/Q signals) which are digital signals provided from the antenna system 3 through the signal transmission line 4, and performing a digital demodulation process on the receive baseband signals and thereby generating receive data. The baseband unit 2 provides the receive data which is obtained by demodulating the receive baseband signals, to the upper network.

As such, the baseband unit 2 has the functions of performing processes such as digital modulation and demodulation processes on data and baseband signals which are transmitted and received by radio communication.

The antenna system 3 includes a plurality of antennas 6 (three in an example in the drawing) supported at an upper part by a mast 5.

Each antenna 6 sets one of three areas into which a surrounding area of the radio communication device 1 is divided, as a cell C which is an area where the radio communication device 1 can communicate with mobile terminals.

The antenna system 3 includes the three antennas 6 and thereby forms, around the antenna system 3, cells C where the radio communication device 1 can communicate with mobile terminals.

Each antenna 6 of the present embodiment includes, as will be described later, a plurality of antenna elements. Each antenna 6 can control the tilt angle (directivity) thereof by adjusting the phases and gains of signals to be transmitted by the respective antenna elements. By this, each antenna 6 can transmit a plurality of transmit signals (two in the example in the drawing) toward the same area (cell) at different tilt angles and in a direction going away from the antenna 6.

Note that the "area" in the present embodiment indicates a single cell C with no sector divisions; however, when a single cell C is divided into a plurality of sectors, a single sector may be referred to as an "area". Namely, the "area" may be any area where a mobile terminal that performs radio communication with the radio communication device 1 can move around without handover.

<For the Configuration of the Antenna System>

Figure 2:
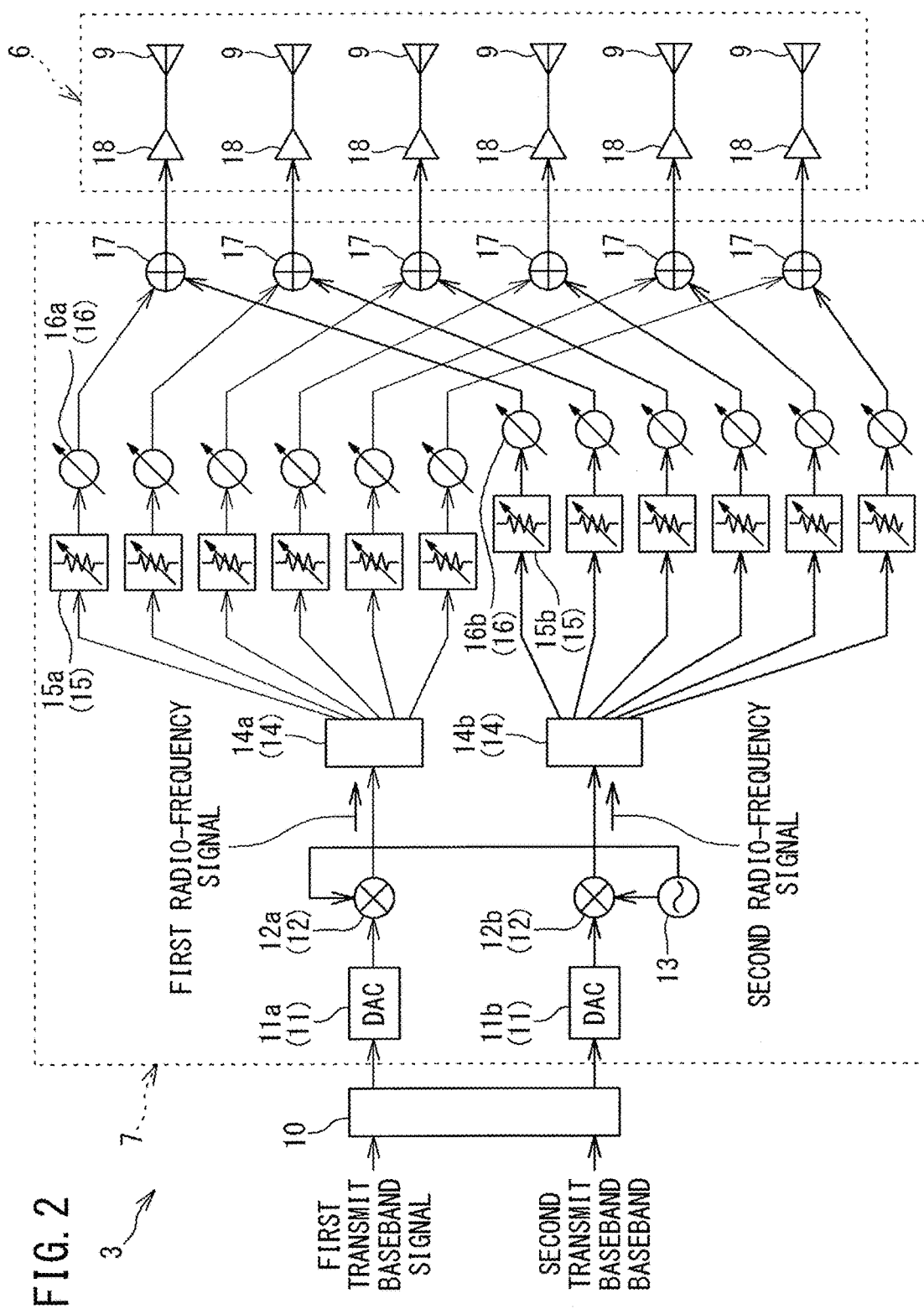
FIG. 2 is a block diagram showing a configuration on the transmitting side of an antenna system.

FIG. 2 is a block diagram showing a configuration on the transmitting side of the antenna system 3 according to the first embodiment. The antenna system 3 of the present embodiment is composed of an active antenna system configured to perform signal processing such as the splitting, phase adjustment, and combining of transmit signals, by analog signal processing.

The antenna system 3 includes a digital signal processing portion 10, an analog signal processing portion 7, and an antenna 6. The antenna 6 includes a plurality of antenna elements 9 (six in an example in the drawing); and a plurality of power amplifiers 18 (six in the example in the drawing) provided for the respective antenna elements 9.

A plurality of transmit baseband signals (two in the example in the drawing) destined for the same area are provided to the digital signal processing portion 10 from the baseband unit 2. Of the two transmit baseband signals, one is also hereinafter referred to as a first transmit baseband signal and the other as a second transmit baseband signal.

The digital signal processing portion 10 performs digital signal processing on the first transmit baseband signal and the second transmit baseband signal, as necessary, and then provides the transmit baseband signals to the analog signal processing portion 7.

The analog signal processing portion 7 functions as a signal processing portion that splits each of the plurality of transmit signals provided from the digital signal processing portion 10 into signals for the respective plurality of antenna elements 9, multiplies each of the plurality of split transmit signals by a corresponding element of a weighting matrix (described later) using gain adjustment and phase adjustment, and then combines those of the transmit signals provided for each corresponding antenna element 9.

The analog signal processing portion 7 includes a plurality of digital-analog converters 11, a plurality of up-converters 12, a plurality of splitters 14, a plurality of variable attenuators 15, a plurality of phase shifters 16, and a plurality of combiners 17.

The digital-analog converters 11 are provided in a pair for the respective two transmit baseband signals. The first transmit baseband signal is provided to one digital-analog converter 11a from the digital signal processing portion 10, and the second transmit baseband signal is provided to the other digital-analog converter 11b from the digital signal processing portion 10.

The digital-analog converter 11a has the function of converting the first transmit baseband signal which is a digital signal to an analog signal. In addition, the digital-analog converter 11b has the function of converting the second transmit baseband signal which is a digital signal to an analog signal.

The digital-analog converters 11 (11a and 11b) provide the first transmit baseband signal and the second transmit baseband signal which have been converted to analog signals, to the up-converters 12.

The up-converters 12 are provided in a pair for the respective digital-analog converters 11 in a pair. The first transmit baseband signal having been converted to an analog signal is provided to one up-converter 12a, and the second transmit baseband signal having been converted to an analog signal is provided to the other up-converter 12b.

The up-converter 12a has the function of converting (up-converting) the first transmit baseband signal to a radio-frequency signal (first radio-frequency signal) by multiplying the first transmit baseband signal by a radio-frequency local signal which is generated by an oscillator 13.

The up-converter 12b has the function of converting (up-converting) the second transmit baseband signal to a radio-frequency signal (second radio-frequency signal) by multiplying the second transmit baseband signal by the radio-frequency local signal which is generated by the oscillator 13.

The up-converters 12 (12a and 12b) provide the first radio-frequency signal which is obtained by frequency-converting the first transmit baseband signal and the second radio-frequency signal which is obtained by frequency-converting the second transmit baseband signal, to the splitters 14.

The splitters 14 are provided in a pair for the respective digital-analog converters 11 in a pair. The first radio-frequency signal is provided to one splitter 14a from the up-converter 12a, and the second radio-frequency signal is provided to the other splitter 14b from the up-converter 12b.

The splitter 14a splits the first radio-frequency signal into a plurality of signals for the respective plurality of antenna elements 9.

In addition, the splitter 14b splits the second radio-frequency signal into a plurality of signals for the respective plurality of antenna elements 9.

In the present embodiment, since the antenna 6 includes the six antenna elements 9, each of the splitters 14a and 14b splits the radio-frequency signal provided from a corresponding up-converter 12 into six signals.

The plurality of combiners 17 are provided at a stage subsequent to the splitters 14a and 14b. The combiners 17 are provided in a plural number (six) for the respective plurality of antenna elements 9. Each combiner 17 is connected to each splitter 14 through a corresponding one of the plurality of phase shifters 16 and a corresponding one of the plurality of variable attenuators 15.

The radio-frequency signals split by the splitters 14a and 14b are subjected to gain adjustment by the variable attenuators 15 and phase adjustment by the phase shifters 16 and then provided to the combiners 17.

To each combiner 17 are provided radio-frequency signals that are split for the same antenna element among the radio-frequency signals split by the splitters 14a and 14b.

Each combiner 17 is configured to combine radio-frequency signals that are split for the same antenna element.

For example, in FIG. 2, a combiner 17 located at the top on paper is provided for an antenna element 9 located at the top on paper. To the combiner 17 located at the top on paper are provided a radio-frequency signal that is split by the splitter 14a for the antenna element 9 located at the top on paper, and a radio-frequency signal that is split by the splitter 14b for the antenna element 9 located at the top on paper.

As such, to each combiner 17 are provided a radio-frequency signal from the splitter 14a and a radio-frequency signal from the splitter 14b which are signals provided for the same antenna element 9.

Each combiner 17 combines the radio-frequency signals provided for the same antenna element 9 and outputs the combined signals.

The combined signals outputted from each combiner 17 are provided to a corresponding power amplifier 18 in the antenna 6 and amplified by the power amplifier 18, and then provided to a corresponding antenna element 9.

The combined signals provided to each antenna element 9 are radiated into space from the antenna element 9 and transmitted as radio signals.

The plurality of variable attenuators 15 are provided at a stage subsequent to the splitters 14 and between the splitters 14 and the phase shifters 16. The plurality of variable attenuators 15 include a plurality of first variable attenuators 15a connected between the one splitter 14a and corresponding phase shifters 16; and a plurality of second variable attenuators 15b connected between the other splitter 14b and corresponding phase shifters 16.

The first variable attenuators 15a and the second variable attenuators 15b each are provided in a plural number (six) for the respective plurality of antenna elements 9.

The first radio-frequency signals split by the one splitter 14a are provided to the plurality of first variable attenuators 15a.

The plurality of first variable attenuators 15a perform gain adjustment on the first radio-frequency signals split by the splitter 14a.

The second radio-frequency signals split by the other splitter 14b are provided to the plurality of second variable attenuators 15b.

The plurality of second variable attenuators 15b perform gain adjustment on the second radio-frequency signals split by the splitter 14b.

As such, the variable attenuators 15 perform gain adjustment for each of the plurality of transmit signals (the first radio-frequency signals and the second radio-frequency signals) at the plurality of antenna elements 9.

The plurality of phase shifters 16 are provided at a stage later than the splitters 14 and between the variable attenuators 15 and the combiners 17. The plurality of phase shifters 16 include a plurality of first phase shifters 16a connected between the first variable attenuators 15a and the combiners 17; and a plurality of second phase shifters 16b connected between the second variable attenuators 15b and the combiners 17. The first phase shifters 16a and the second phase shifters 16b each are provided in a plural number (six) for the respective plurality of antenna elements 9. In addition, the first phase shifters 16a and the second phase shifters 16b each are composed of a semiconductor phase shifter configured to switch lines by a semiconductor switch.

The first radio-frequency signals having been subjected to the gain adjustment by the first variable attenuators 15a are provided to the plurality of first phase shifters 16a.

The plurality of first phase shifters 16a perform phase adjustment on the first radio-frequency signals having been subjected to the gain adjustment by the first variable attenuators 15a. By this, the plurality of first phase shifters 16a can control the tilt angles (directivities) of the plurality of antenna elements 9 for when the first radio-frequency signals are transmitted from the antenna elements 9, respectively.

The second radio-frequency signals having been subjected to the gain adjustment by the second variable attenuators 15b are provided to the plurality of second phase shifters 16b.

The plurality of second phase shifters 16b perform phase adjustment on the second radio-frequency signals having been subjected to the gain adjustment by the second variable attenuators 15b. By this, the plurality of second phase shifters 16b can control the tilt angles (directivities) of the plurality of antenna elements 9 for when the second radio-frequency signals are transmitted from the antenna elements 9, respectively.

The plurality of first phase shifters 16a and the plurality of second phase shifters 16b perform phase adjustment such that a tilt angle for when the first radio-frequency signals are transmitted from the plurality of antenna elements 9 differs from a tilt angle for when the second radio-frequency signals are transmitted from the plurality of antenna elements 9.

As such, the phase shifters 16 perform phase adjustment for each of the plurality of transmit signals (the first radio-frequency signals and the second radio-frequency signals) such that tilt angles (directivities) for the respective plurality of transmit signals (the first radio-frequency signals and the second radio-frequency signals) at the plurality of antenna elements 9 become tilt angles for the respective plurality of transmit signals.

As described above, the first radio-frequency signals split by the splitter 14a and the second radio-frequency signals split by the splitter 14b are subjected to gain adjustment by the variable attenuators 15 and phase adjustment by the phase shifters 16, and then provided to the combiners 17.

Each combiner 17 combines a first radio-frequency signal and a second radio-frequency signal that are provided for the same antenna element 9, and outputs the combined signals.

The combined signals outputted from each combiner 17 are amplified by a corresponding power amplifier 18 in the antenna 6 and provided to a corresponding antenna element 9, and transmitted as radio signals from the antenna element 9. Each antenna element 9 can transmit a first radio-frequency signal and a second radio-frequency signal by transmitting combined signals where the first radio-frequency signal and the second radio-frequency signal are combined.

The first radio-frequency signals transmitted from the respective antenna elements 9 are transmitted by the control of tilt angles by the plurality of first phase shifters 16a.

In addition, the second radio-frequency signals transmitted from the respective antenna elements 9 are transmitted such that tilt angles obtained by the plurality of second phase shifters 16b are controlled to be different from the tilt angles obtained by the plurality of first phase shifters 16a.

By this, the antenna system 3 can transmit a plurality of transmit signals toward the same area at different tilt angles.

<For the Control Configuration of the Radio Communication Device>

Figure 3:
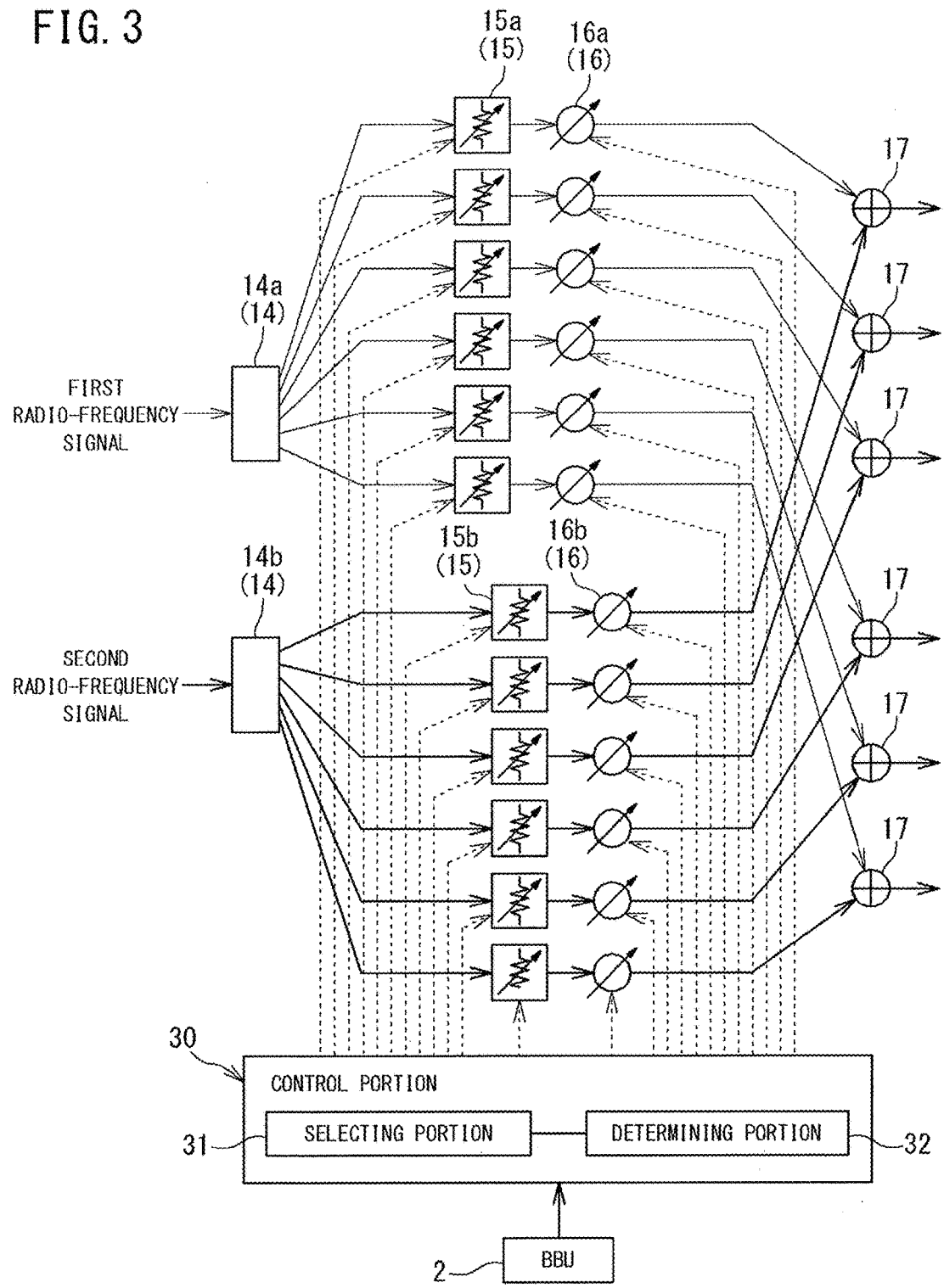
FIG. 3 is a block diagram showing a control configuration of the radio communication device.

FIG. 3 is a block diagram showing a control configuration of the radio communication device 1.

The radio communication device 1 includes a control portion 30 that individually controls the plurality of variable attenuators 15 and the plurality of phase shifters 16.

The control portion 30 is composed of a computer including a CPU, a memory portion, etc. The control portion 30 has the function of implementing functional portions included in the control portion 30 which will be described below, by reading a program, etc., stored in the memory portion, and performing various types of processes.

The control portion 30 is connected to the baseband unit 2 and receives from the baseband unit 2 a control instruction for changing the tilt angle of each antenna element 9 or control information including a carrier frequency.

The control portion 30 has the function of determining, based on the control information received from the baseband unit 2, a weighting matrix to be multiplied to a plurality of radio-frequency signals split by the splitters 14. Then, the control portion 30 has the function of controlling the corresponding variable attenuators 15 and phase shifters 16 based on elements of the determined weighting matrix in order to multiply the plurality of radio-frequency signals split by the splitters 14 by the elements.

When a radio-frequency signal provided from the baseband unit 2 is x and a transmit signal radiated from an antenna element 9 is y, a relationship between the signals x and y and a weighting matrix w is represented as shown in the following equation (1):

$$y = w^H x \tag{1}$$

where the superscript H represents the complex conjugate transpose.

The weighting matrix w of the present embodiment is generated based on a discrete cosine transform (DCT) matrix B. When the number of transmit signals y is N, the DCT matrix B is represented by a matrix of N rows by N columns (N×N). An element $B_{mn}$ in the mth row and nth column of the DCT matrix B is represented as shown in the following equations (2) and (3):

[Expression 1]

$$B_{mn} = \frac{1}{\sqrt{N}} \cos\left(\frac{\pi(2m-1)(n-1)}{2N}\right) \tag{2}$$

$$B_{mn} = \frac{2}{\sqrt{N}} \cos\left(\frac{\pi(2m-1)(n-1)}{2N}\right) \tag{3}$$

where equation (2) represents the case of n=1 and equation (3) the case of n≠1.

When the number of radio-frequency signals x is M, the weighting matrix w consists of M row vectors which are selected and determined from among N row vectors of the DCT matrix B. Namely, the weighting matrix w is represented by a matrix of M rows by N columns (M×N). Equation (1) is represented in matrix form as shown in the following equation (4):

[Expression 2]

$$\begin{pmatrix} y_1 \\ \vdots \\ y_N \end{pmatrix} = \begin{pmatrix} w_{11} & \cdots & w_{1N} \\ \vdots & \ddots & \vdots \\ w_{M1} & \cdots & w_{MN} \end{pmatrix}^H \begin{pmatrix} x_1 \\ \vdots \\ x_M \end{pmatrix} \tag{4}$$

In the present embodiment, since the number (M) of radio-frequency signals provided from the baseband unit 2 is two and the number (N) of transmit signals radiated from the antenna elements 9 is six, equation (4) is represented as shown in the following equation (5):

[Expression 3]

$$\begin{pmatrix} y_1 \\ \vdots \\ y_6 \end{pmatrix} = \begin{pmatrix} w_{11} & \cdots & w_{16} \\ w_{21} & \cdots & w_{26} \end{pmatrix}^H \begin{pmatrix} x_1 \\ x_2 \end{pmatrix} \tag{5}$$

where $x_1$ represents the first radio-frequency signal and $x_2$ the second radio-frequency signal.

In the weighting matrix w of the present embodiment, the elements of one weight row vector $w_1$ ($w_{11} \ldots w_{16}$) are multiplied to six first radio-frequency signals, respectively, which are split by the splitter 14a. Namely, the control portion 30 controls the corresponding variable attenuators 15a and phase shifters 16a, based on the elements of the weight row vector $w_1$ ($w_{11} \ldots w_{16}$).

For example, to multiply a first radio-frequency signal that is split at the top on paper in FIG. 3 by one element $w_{11}$ of the weight row vector $w_1$ ($w_{11} \ldots w_{16}$), the control portion 30 controls a variable attenuator 15a and a phase shifter 16a that are located at the top on paper, based on the element $w_{11}$.

In addition, in the weighting matrix w of the present embodiment, the elements of the other weight row vector $w_2$ ($w_{21} \ldots w_{26}$) are multiplied to six second radio-frequency signals, respectively, which are split by the splitter 14b. Namely, the control portion 30 controls the corresponding variable attenuators 15b and phase shifters 16b, based on the elements of the weight row vector $w_2$ ($w_{21} \ldots w_{26}$).

For example, to multiply a second radio-frequency signal that is split at the bottom on paper in FIG. 3 by one element $w_{26}$ of the weight row vector $w_2$ ($w_{21} \ldots w_{26}$), the control portion 30 controls a variable attenuator 15b and a phase shifter 16b that are located at the bottom on paper, based on the element $w_{26}$.

The weight row vector $w_1$ ($w_{11} \ldots w_{16}$) and weight row vector $w_2$ ($w_{21} \ldots w_{26}$) of the weighting matrix w are orthogonal to each other. Namely, the control portion 30 controls the plurality of variable attenuators 15 and the plurality of phase shifters 16 such that the two weight row vectors $w_1$ and $w_2$ are orthogonal to each other. The term "orthogonal" used herein means that the sum of cross-correlations of the two weight row vectors $w_1$ and $w_2$ is 0.

Note that although the weighting matrix w of the present embodiment is set such that the weight row vectors are multiplied to radio-frequency signals, the weighting matrix w may be set such that the weight column vectors are multiplied.

<For Determination of a Weighting Matrix>

In FIG. 3, the control portion 30 includes a selecting portion 31 that selects a plurality of weight candidates as candidates for the weight row vectors $w_1$ and $w_2$ of the weighting matrix w; and a determining portion 32 that determines the weight row vectors $w_1$ and $w_2$ from among the selected weight candidates.

The selecting portion 31 has the function of selecting a larger number of weight candidates than the number of weight row vectors of the weighting matrix w from among a plurality of weight candidates (here, weight row vectors) which are pre-stored in the memory portion. At that time, the selecting portion 31 selects weight candidates based on the tilt angles of beams to the area (cell C) which are included in control information received from the baseband unit 2.

In the present embodiment, N (six) row vectors of the discrete cosine transform matrix B which support a 180-degree angle range from the straight-up direction to straight-down direction of the tilt angles of the antenna elements 9 are pre-stored in the memory portion as weight candidates. The selecting portion 31 narrows down and selects weight candidates associated with angle ranges close to the tilt angles of beams to the area (cell C) from among the six weight candidates. At that time, the selecting portion 31 selects three or more weight candidates such that the number of weight candidates is larger than the number (two) of weight row vectors of the weighting matrix w.

Note that all weight candidates stored in the memory portion satisfy a relationship of the following equation (6) so as to be orthogonal to each other:

[Expression 4]

$$w_i^H \cdot w_j = 0 \quad (i \neq j) \qquad (6)$$

The determining portion 32 in the control portion 30 has the function of determining, as the weight row vectors $w_1$ and $w_2$ of the weighting matrix w, weight candidates that satisfy desired communication quality from among the plurality of weight candidates selected by the selecting portion 31.

Specifically, the determining portion 32 first performs actual radio communication using any two weight candidates as the two weight row vectors $w_1$ and $w_2$ from among the selected plurality of weight candidates, and thereby determines the communication quality thereof.

A communication quality determination is repeatedly made for all pairable pairs where any two of the selected plurality of weight candidates make a pair.

Then, the determining portion 32 determines a pair that most satisfies desired communication quality, as the weight row vectors $w_1$ and $w_2$.

Figure 4:
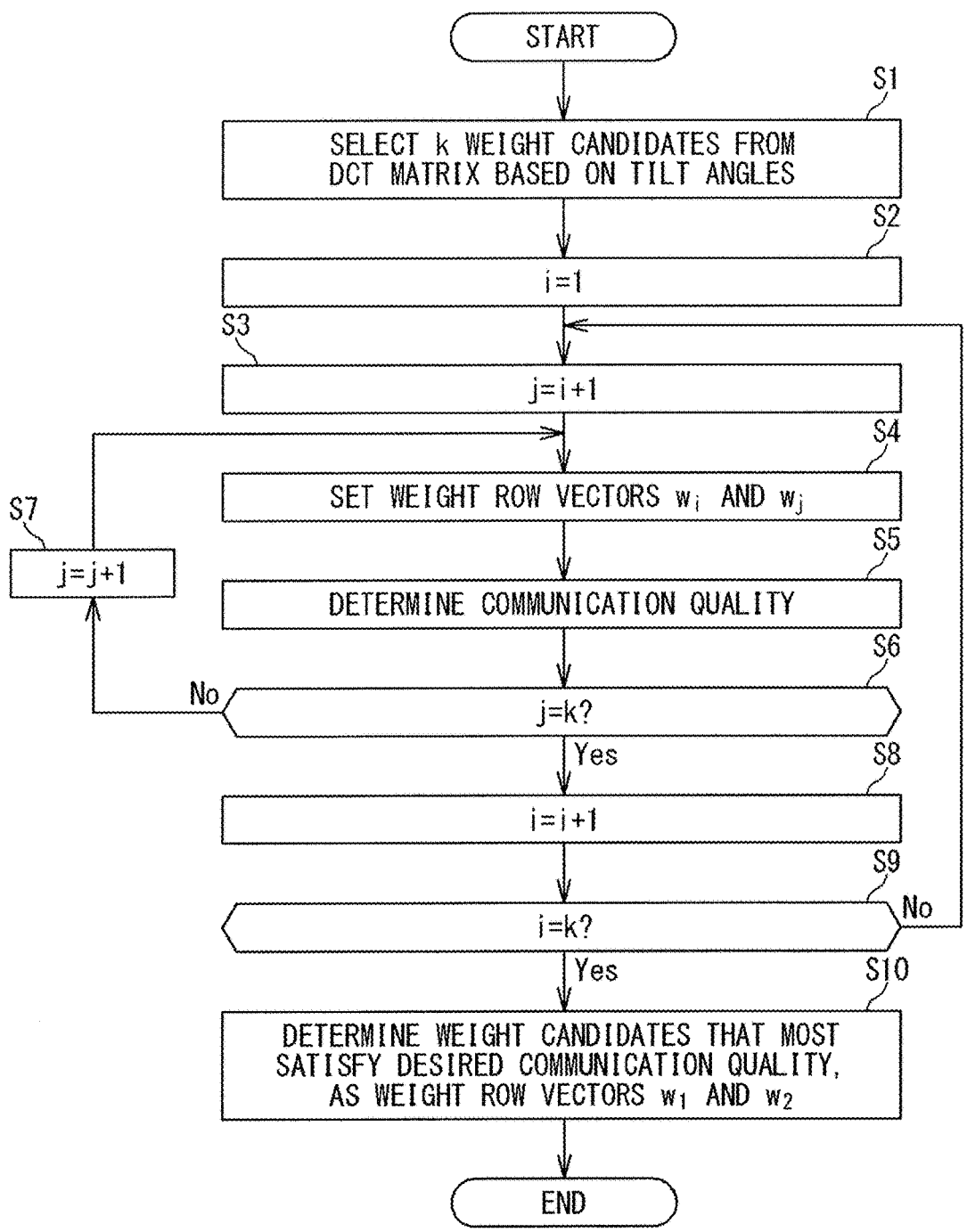
FIG. 4 is a flowchart showing a weighting matrix determination procedure performed by a control portion.

FIG. 4 is a flowchart showing a weighting matrix w determination procedure performed by the control portion 30.

First, the selecting portion 31 in the control portion 30 selects, as candidates for weight row vectors $w_1$ and $w_2$ provided for a first radio-frequency signal and a second radio-frequency signal, respectively, a larger number of k weight candidates than the number of the weight row vectors $w_1$ and $w_2$ from N row vectors of a discrete cosine transform matrix B, based on the tilt angles of beams (step S1, a selecting step).

Then, the determining portion 32 in the control portion 30 sets a variable i=1 as its initial setting (step S2) and thereafter sets a variable j=i+1 (step S3). Then, the determining portion 32 sets, as temporary weight row vectors $w_1$ and $w_2$, weight row vectors $w_i$ and $w_j$ which are a pair of weight candidates from among the selected weight candidates (step S4).

Then, the determining portion 32 controls corresponding variable attenuators 15 and phase shifters 16 based on the weight row vectors $w_i$ and $w_j$, and performs actual radio communication and thereby determines communication quality (step S5). Thereafter, the determining portion 32 determines whether the variable j=k (step S6).

If the determination result at step S6 is negative, the determining portion 32 sets the variable j=j+1 (step S7), and thereafter returns to step S4.

On the other hand, if the determination result at step S6 is positive, the determining portion 32 sets the variable i=i+1 (step S8), and thereafter determines whether the variable i=k (step S9).

If the determination result at step S9 is negative, the determining portion 32 returns to step S3.

On the other hand, if the determination result at step S9 is positive, i.e., a communication quality determination is done for all pairable pairs where any two of the selected k weight candidates make a pair, the determining portion 32 determines a pair of weight candidates that most satisfies desired communication quality, as the weight row vectors $w_1$ and $w_2$ of the weighting matrix w (step S10, a determining step).

<For Variants>

The weighting matrix w of the present embodiment is generated based on the DCT matrix, but may be generated based on a discrete Fourier transform (DFT) matrix. In this case, an element B'$_{mn}$ in the mth row and nth column of a DFT matrix B' is represented as shown in the following equation (7):

[Expression 5]

$$B'_{mn} = \frac{1}{\sqrt{N}} e^{\frac{-2\pi j(m-1)(n-1)}{N}} \quad (7)$$

where j is the imaginary unit.

When the weighting matrix w is thus generated based on the DFT matrix B', since the control portion 30 does not need to perform gain adjustment, the variable attenuators 15 (see FIG. 2) are not necessary. Hence, a reduction in power loss can be suppressed compared to the case of generating the weighting matrix w based on the DCT matrix B.

In addition, besides the DCT matrix and the DFT matrix, the weighting matrix w may be generated based on a Hadamard transform matrix. In this case, a Hadamard transform matrix H is a matrix of N rows by N columns (N×N) as with the DCT matrix B, and represented as shown in the following equation (8):

[Expression 6]

$$H_{2^k} = \begin{bmatrix} H_{2^{k-1}} & H_{2^{k-1}} \\ H_{2^{k-1}} & -H_{2^{k-1}} \end{bmatrix} \quad (8)$$

where $H_2$ is a matrix of two rows by two columns with the elements "1" and "−1", and k is an integer greater than or equal to 2.

When the weighting matrix w is thus generated based on the Hadamard transform matrix H, since the elements of the matrix H are only "1" and "−1", phase adjustment, etc., can be easily performed. Hence, it becomes easy to implement the function of multiplying each of a plurality of transmit signals by a corresponding element of the weighting matrix w.

Note that the weighting matrix w may be generated based on matrices other than the DCT matrix, DFT matrix, and Hadamard transform matrix.

<For Antenna Performance>

Figure 5:
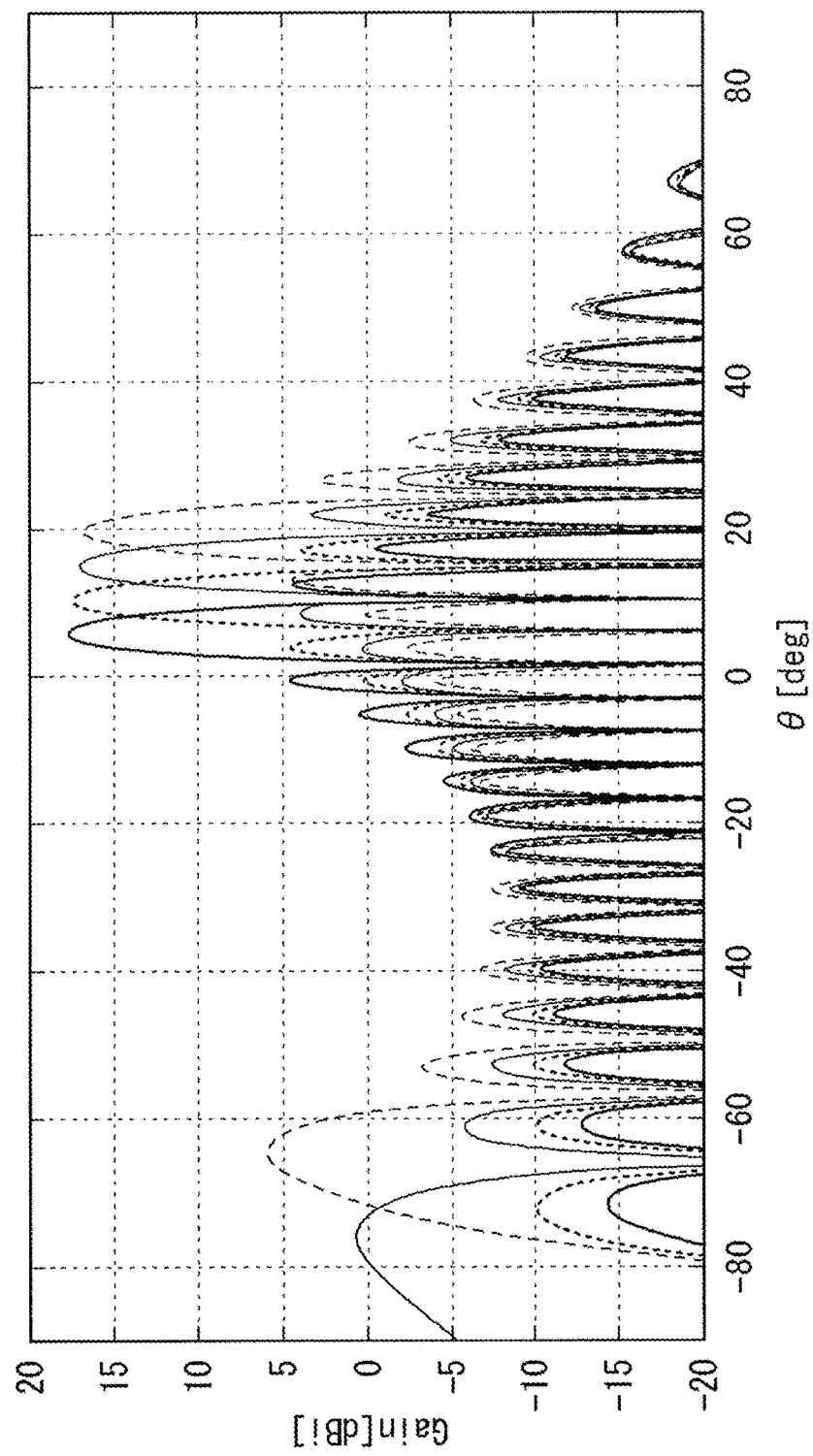
FIG. 5 is a diagram showing the vertical plane directivity of an antenna for a case of generating a weighting matrix based on a DFT matrix.

FIG. 5 is a diagram showing the vertical plane directivity of an antenna for a case of generating a weighting matrix based on the DFT matrix. In addition, FIG. 6 is a diagram showing the vertical plane directivity of an antenna for a case of generating a weighting matrix based on the DCT matrix.

Figure 6:
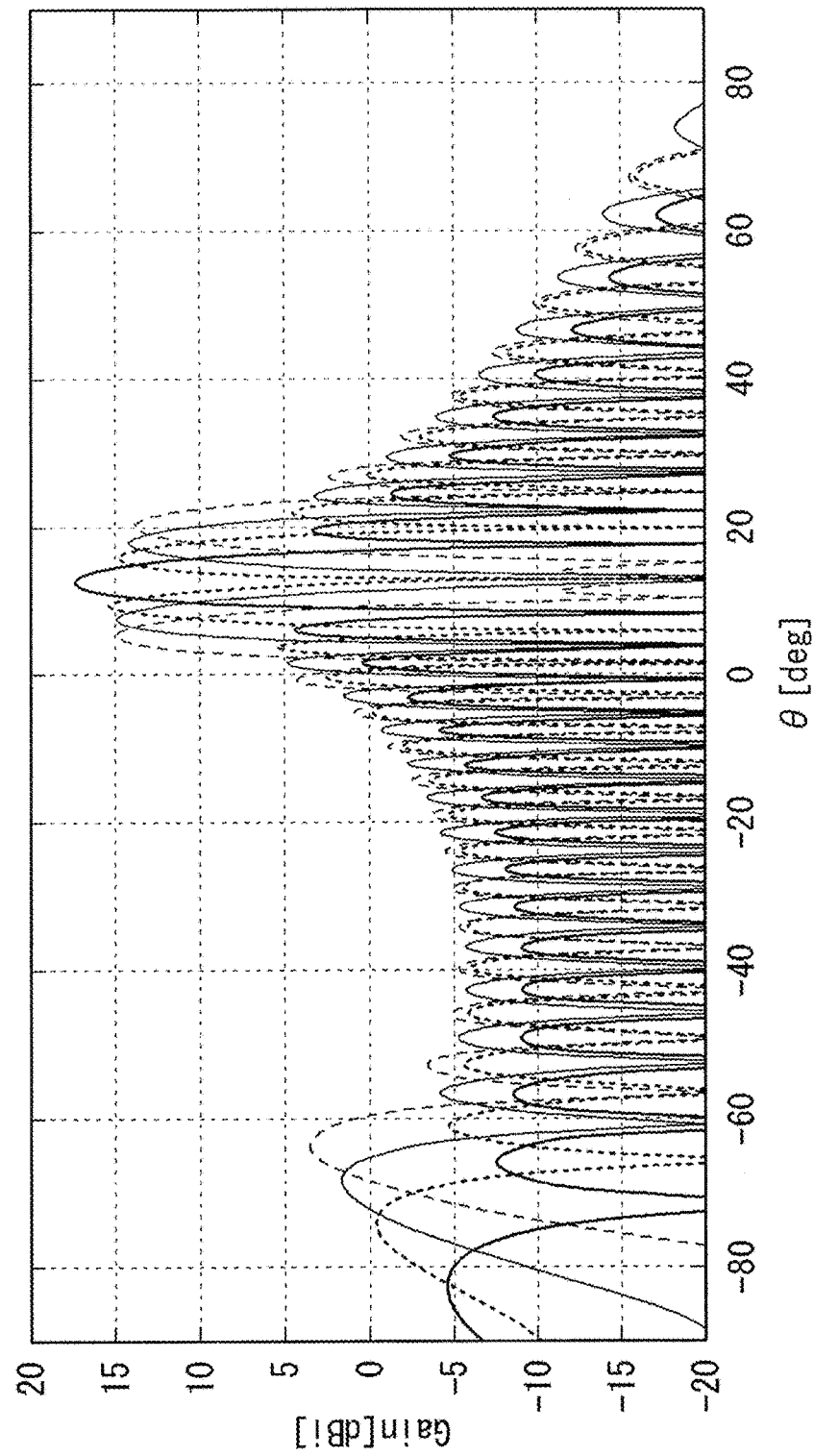
FIG. 6 is a diagram showing the vertical plane directivity of an antenna for a case of generating a weighting matrix based on a DCT matrix.

Note that the drawings show vertical plane directivities for when both of the antennas shown in FIGS. 5 and 6 transmit four transmit signals, and the vertical plane directivities of the respective transmit signals are shown by different types of lines: a thick solid line, a dotted line, a thin solid line, and a dashed line.

As shown in FIG. 5, in the vertical plane directivity of the antenna for the case of generating a weighting matrix based on the DFT matrix, portions where adjacent beams among the four main beams overlap each other in a left-right direction in the drawing are small. Hence, it can be seen that a mobile terminal strongly receives only a specific transmit signal, depending on the receive location of the transmit signals.

On the other hand, as shown in FIG. 6, in the vertical plane directivity of the antenna for the case of generating a weighting matrix based on the DCT matrix, portions where adjacent beams among the four main beams overlap each other in a left-right direction in the drawing are large compared to the vertical plane directivity shown in FIG. 5. Hence, it can be seen that a mobile terminal can receive four transmit signals transmitted from a single antenna in a good balance.

<For Effects>

As described above, according to the radio communication device 1 of the present embodiment, each of a plurality of transmit signals generated by the baseband unit 2 and destined for the same area is split into signals for the respective plurality of antenna elements 9 included in a single antenna 6, each of the plurality of split transmit signals is multiplied by a weighting matrix, and those of the transmit signals provided for each corresponding antenna element 9 are combined. Hence, a plurality of transmit signals destined for the same area can be transmitted using a single antenna 6 in a shared manner. As a result, the plurality of transmit signals destined for the same area can be transmitted by a smaller number of antennas 6 than the number of the transmit signals.

In addition, the plurality of digital-analog converters 11 are provided at a stage previous to the plurality of splitters 14. Hence, it is sufficient that the digital-analog converters 11 be provided for the respective plurality of transmit signals destined for the same area. Accordingly, the number of the digital-analog converters 11 can be reduced over a case in which a digital-analog converter 11 is provided for each of the plurality of antenna elements 9. As a result, a reduction in cost is possible.

In addition, since the phase shifters 16 are provided at a stage earlier than the power amplifiers 18, pre-amplification transmit signals are provided to the phase shifters 16. Since the pre-amplification transmit signals are lower in power compared to post-amplification transmit signals, the phase shifters 16 can be formed that use semiconductor phase shifters whose handleable value of signal power is relatively small. By this, it becomes possible to use more compact, lower-cost phase shifters 16, enabling to achieve lower cost and miniaturization.

In addition, in the weighting matrix w, the weight row vectors $w_1$ and $w_2$ provided for the respective plurality of transmit signals generated by the baseband unit 2 are orthogonal to each other, and thus, a cross-correlation of the plurality of transmit signals destined for the same area can be reduced.

In addition, since the weighting matrix w is generated based on the DCT matrix B, a mobile terminal can receive a plurality of transmit signals transmitted from a single antenna 6 in a good balance. By this, since there is no variation in power between a plurality of transmit signals when the mobile terminal receives the transmit signals, the effects of MIMO communication are more easily exerted compared to a case of generating the weighting matrix w based on the DFT matrix.

In addition, the selecting portion 31 in the control portion 30 selects, based on the tilt angles of beams to the area, multiple weight candidates which serve as candidates for the weight row vectors $w_1$ and $w_2$ provided for the respective plurality of transmit signals generated by the baseband unit 2. Thus, the selecting portion 31 can easily and promptly narrow down the weight candidates. In addition, since the row vectors of the discrete cosine transform matrix B serve as weight candidates to be selected by the selecting portion 31, the weighting matrix w can be easily generated based on the DCT matrix B. Furthermore, since the determining portion 32 in the control portion 30 determines, as the weight row vectors $w_1$ and $w_2$, weight candidates that satisfy desired communication quality from among the multiple weight candidates, the desired communication quality can be obtained.

For a Second Embodiment

Figure 7:
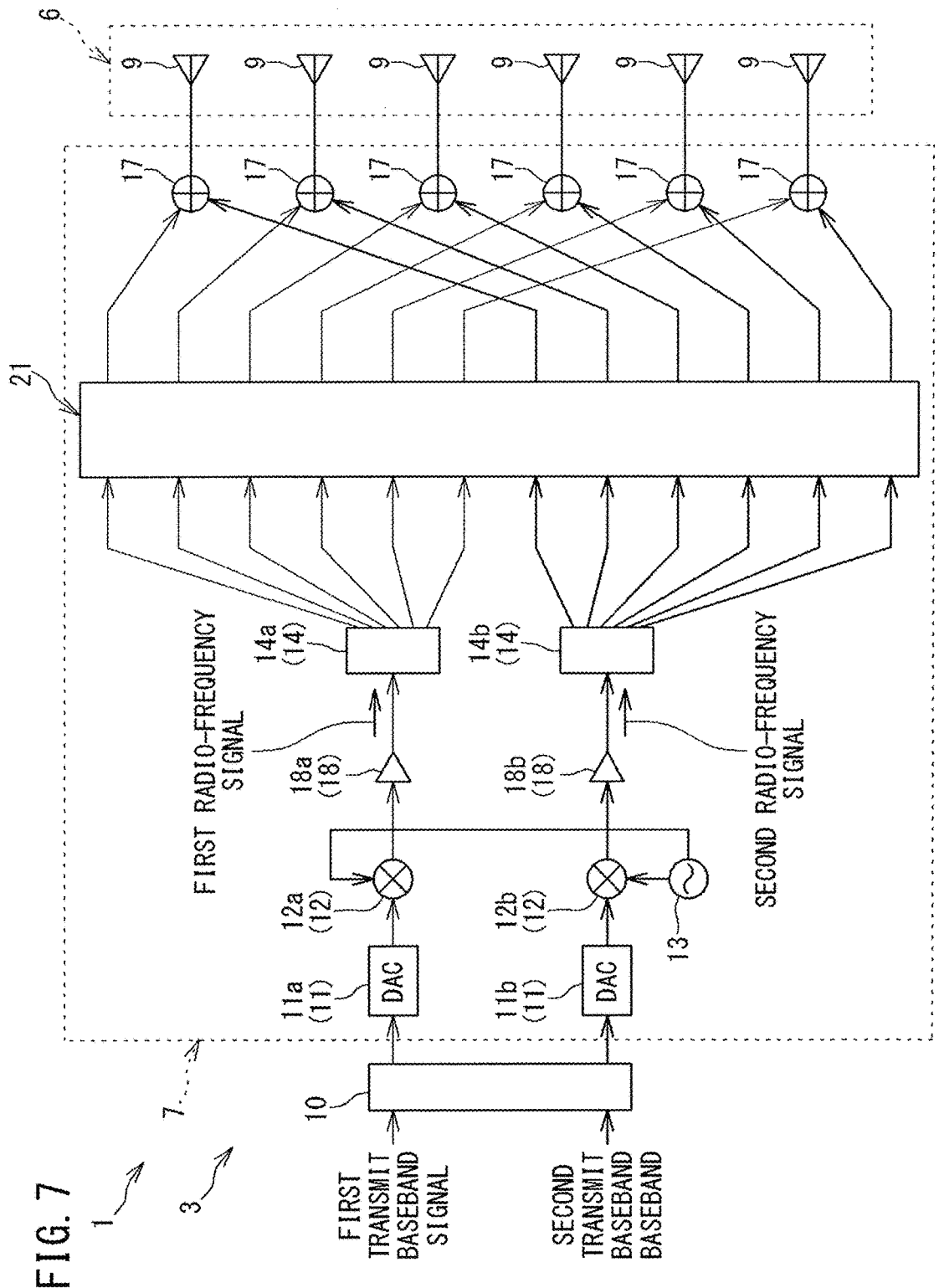
FIG. 7 is a block diagram showing a configuration on the transmitting side of an antenna system included in a radio communication device according to a second embodiment of the present invention.

FIG. 7 is a block diagram showing a configuration on the transmitting side of an antenna system 3 included in a radio communication device 1 according to a second embodiment of the present invention.

The antenna system 3 of the present embodiment is composed of a passive antenna system configured to perform signal processing such as the splitting, phase adjustment, and combining of transmit signals, by analog signal processing. Namely, the antenna system 3 of the present embodiment differs from the antenna system 3 of the first embodiment in that power amplifiers 18 are provided on the earlier stage side than an antenna 6.

In FIG. 7, the power amplifiers 18 of the present embodiment are provided between up-converters 12 (12a and 12b) and splitters 14 (14a and 14b) in an analog signal processing portion 7.

The up-converters 12 (12a and 12b) provide a first radio-frequency signal which is obtained by frequency-converting a first transmit baseband signal and a second radio-frequency signal which is obtained by frequency-converting a second transmit baseband signal, to the power amplifiers 18.

The power amplifiers 18 are provided in a pair for respective digital-analog converters 11 in a pair. The first radio-frequency signal is provided to one power amplifier 18a from the up-converter 12a, and the second radio-frequency signal is provided to the other power amplifier 18b from the up-converter 12b. The power amplifier 18a amplifies the first radio-frequency signal and provides the amplified first radio-frequency signal to the splitter 14a. In addition, the power amplifier 18b amplifies the second radio-frequency signal and provides the amplified second radio-frequency signal to the splitter 14b.

Note that the power amplifiers 18 are included in the analog signal processing portion 7, but may be provided between the analog signal processing portion 7 and the antenna 6, i.e., between a plurality of combiners 17 and a plurality of corresponding antenna elements 9.

The antenna 6 of the present embodiment is composed of only the plurality of antenna elements 9. To each antenna element 9 are provided combined signals which are combined by a corresponding combiner 17.

The combined signals provided to each antenna element 9 are radiated into space from the antenna element 9 and transmitted as radio signals.

The antenna system 3 of the present embodiment also differs from the antenna system 3 of the first embodiment in that a configuration between the splitters 14 and the combiners 17 in the analog signal processing portion 7 differs from that of the first embodiment.

The analog signal processing portion 7 of the present embodiment includes a Butler matrix circuit 21 to multiply each of a plurality of radio-frequency signals which are split by the splitters 14a and 14b by a corresponding element of a weighting matrix w. By the Butler matrix circuit 21, the weighting matrix w is a DFT matrix.

Figure 8:
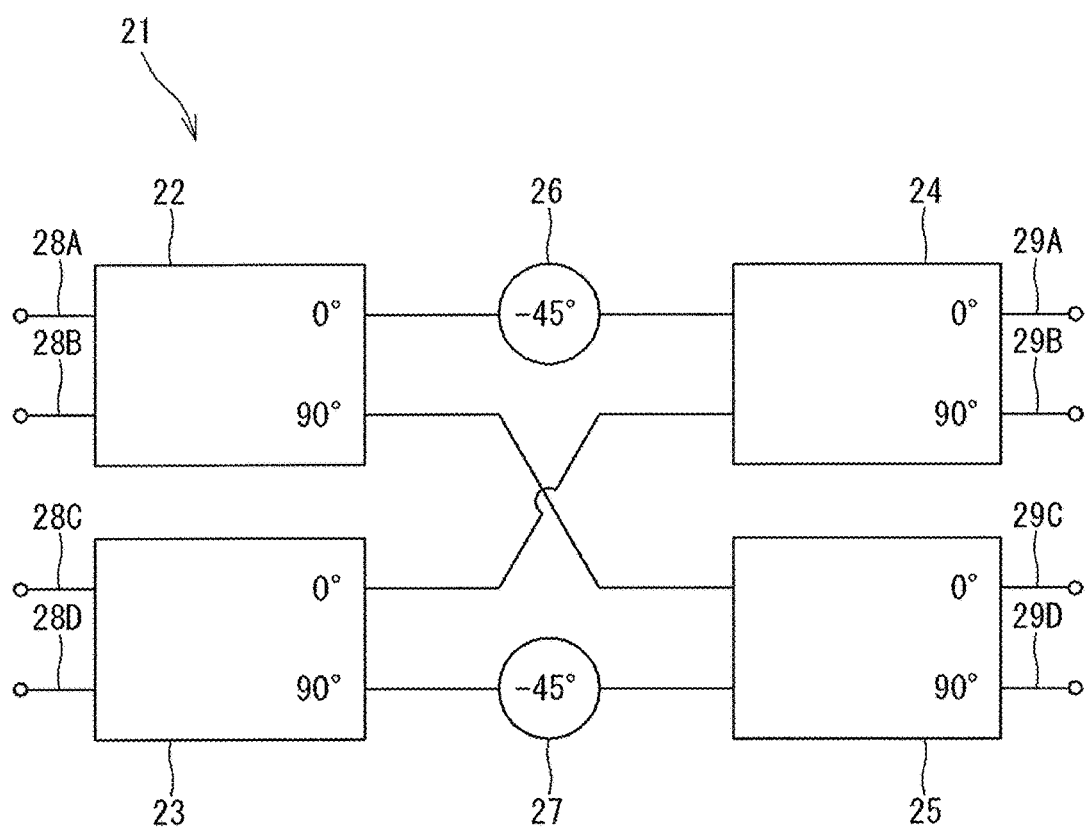
FIG. 8 is a block diagram showing an example of a configuration of a Butler matrix circuit included in the antenna system of FIG. 7.

FIG. 8 is a block diagram showing an example of a configuration of the Butler matrix circuit 21. Note that FIG. 8 exemplifies a common Butler matrix circuit that performs phase adjustment for four radio-frequency signals.

The Butler matrix circuit 21 includes four 90 degree hybrids 22 to 25 and two −45 degree phase shifters 26 and 27.

A pair of input terminals 28A and 28B is connected to the 90 degree hybrid 22, and a pair of input terminals 28C and 28D is connected to the 90 degree hybrid 23. The input terminals 28A to 28D are connected to the corresponding splitters 14 (see FIG. 7).

In addition, a pair of output terminals 29A and 29B is connected to the 90 degree hybrid 24, and a pair of output terminals 29C and 29D is connected to the 90 degree hybrid 25. The output terminals 29A to 29D are connected to the corresponding combiners 17 (see FIG. 7).

One output of the 90 degree hybrid 22 is connected to the 90 degree hybrid 24 through the −45 phase shifter 26, and the other output is connected to the 90 degree hybrid 25.

One output of the 90 degree hybrid 23 is connected to the 90 degree hybrid 25 through the −45 phase shifter 27, and the other output is connected to the 90 degree hybrid 24.

By the above-described configuration, radio-frequency signals inputted to the input terminals 28A to 28D are adjusted to different phases and outputted from the output terminals 29A to 29D.

Other respects of the present embodiment are the same as those of the first embodiment.

Note that the weighting matrix w of the present embodiment may be generated based on a DCT matrix, a Hadamard transform matrix, etc., in addition to the DFT matrix. In this case, the analog signal processing portion 7 may use variable attenuators 15 and phase shifters 16 as in the first embodiment, instead of the Butler matrix circuit 21.

As described above, according to the radio communication device 1 of the present embodiment, the plurality of digital-analog converters 11 are provided on the earlier stage side than the plurality of splitters 14. Hence, it is sufficient that the digital-analog converters 11 be provided for a respective plurality of transmit signals destined for the same area. Accordingly, the number of the digital-analog converters 11 can be reduced over a case in which a digital-analog converter 11 is provided for each of the plurality of antenna elements 9. As a result, a reduction in cost is possible.

For a Third Embodiment

Figure 9:
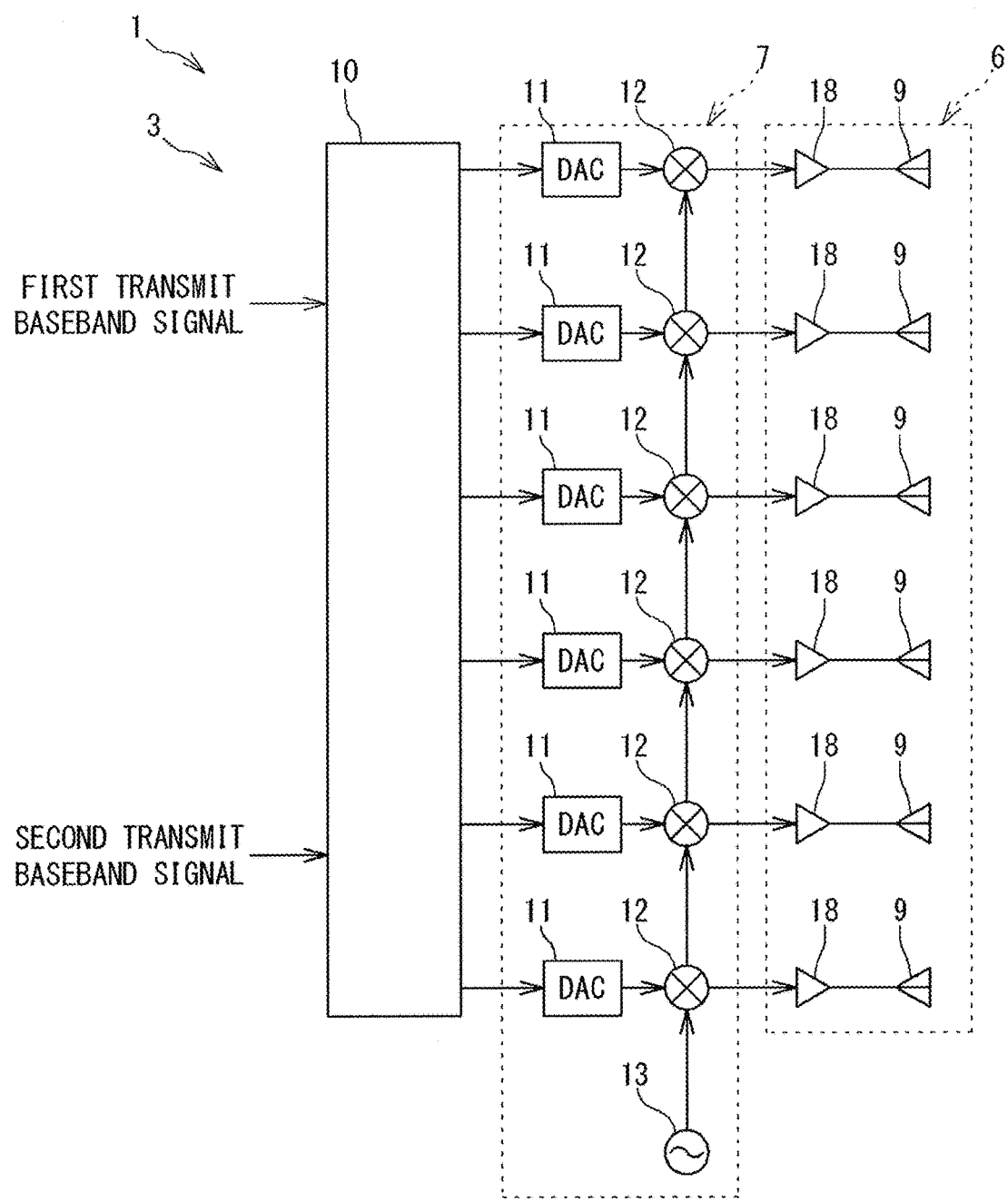
FIG. 9 is a block diagram showing a configuration on the transmitting side of an antenna system included in a radio communication device according to a third embodiment of the present invention.

FIG. 9 is a block diagram showing a configuration on the transmitting side of an antenna system 3 included in a radio communication device 1 according to a third embodiment of the present invention.

The antenna system 3 of the present embodiment is composed of an active antenna system configured to perform signal processing such as the splitting, phase adjustment, and combining of transmit signals, by digital signal processing.

In FIG. 9, a digital signal processing portion 10 of the present embodiment functions as a signal processing portion that splits each of a plurality of transmit signals provided from a baseband unit 2 into signals for a respective plurality of antenna elements 9, multiplies each of the plurality of split transmit signals by a corresponding element of a weighting matrix w, and then combines those of the transmit signals provided for each corresponding antenna element 9.

Specifically, the digital signal processing portion 10 splits each of a first transmit baseband signal and a second transmit baseband signal which are provided from the baseband unit 2 into six signals for the six antenna elements 9.

The digital signal processing portion 10 performs gain adjustment and phase adjustment on each of the split first transmit baseband signals and performs gain adjustment and phase adjustment on each of the split second transmit baseband signals.

Furthermore, the digital signal processing portion 10 combines transmit baseband signals that are split for the same antenna element 9 among the first transmit baseband signals and the second transmit baseband signals which have been subjected to the gain adjustment and phase adjustment, and provides the combined signals to an analog signal processing portion 7.

The analog signal processing portion 7 of the present embodiment includes a plurality of digital-analog converters 11 and a plurality of up-converters 12.

The six digital-analog converters 11 are provided for the respective six antenna elements 9. Each digital-analog converter 11 has the function of converting corresponding combined signals of digital signals to analog signals. Each digital-analog converter 11 provides the combined signals having been converted to analog signals to a corresponding up-converter 12.

The six up-converters 12 are provided for the respective six antenna elements 9. Each up-converter 12 has the function of converting (up-converting) corresponding combined signals to radio-frequency signals (first radio-frequency signals) by multiplying the combined signals by a radio-frequency local signal which is generated by an oscillator 13.

Each up-converter 12 provides the radio-frequency signals obtained by frequency-converting corresponding combined signals, to a corresponding power amplifier 18 in an antenna 6.

The six power amplifiers 18 in the antenna 6 are provided for the respective six antenna elements 9. Each power amplifier 18 amplifies corresponding radio-frequency signals and provides the amplified radio-frequency signals to a corresponding antenna element 9. The radio-frequency signals provided to each antenna element 9 are radiated into space from the antenna element 9 and transmitted as radio signals.

Figure 10:
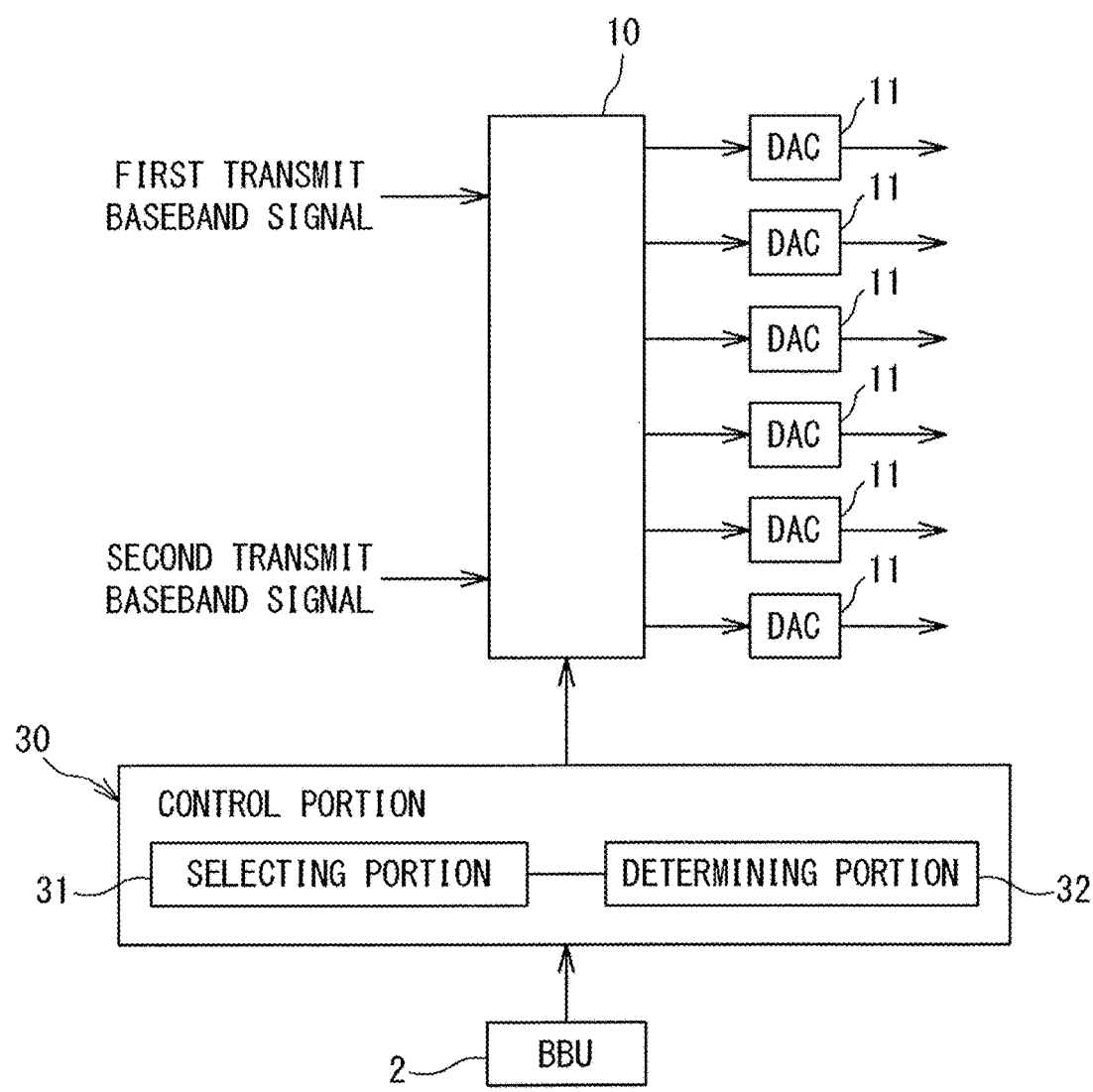
FIG. 10 is a block diagram showing a control configuration of the radio communication device of FIG. 9.

FIG. 10 is a block diagram showing a control configuration of the radio communication device 1 of the present embodiment.

A control portion 30 of the present embodiment has the function of determining, based on control information received from the baseband unit 2, a weighting matrix to be multiplied to a plurality of transmit baseband signals split by the digital signal processing portion 10. Then, the control portion 30 has the function of controlling the digital signal processing portion 10 so as to perform gain adjustment and phase adjustment of a corresponding transmit baseband signal based on each element of the determined weighting matrix w. Other respects are the same as those of the first embodiment.

Note that the weighting matrix w of the present embodiment may be generated based on a DFT matrix, a Hadamard transform matrix, etc., in addition to a DCT matrix.

As described above, according to the radio communication device 1 of the present embodiment, since signal processing ranging from the splitting to combining of transmit signals generated by the baseband unit 2 can be performed by digital signal processing, high-level communication control can be performed compared to a case of performing the signal processing by analog signal processing.

For a Fourth Embodiment

Figure 11:
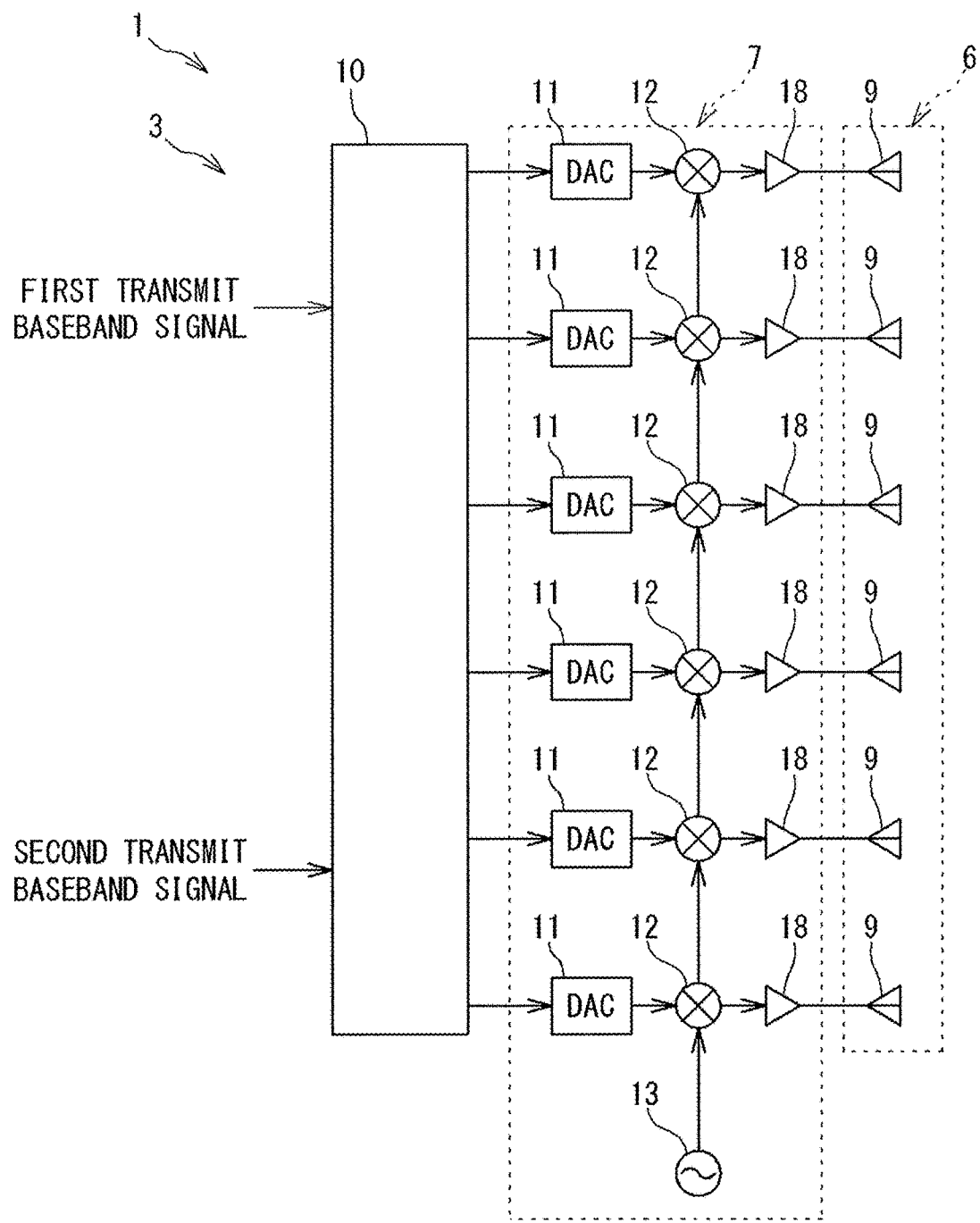
FIG. 11 is a block diagram showing a configuration on the transmitting side of an antenna system included in a radio communication device according to a fourth embodiment of the present invention.

FIG. 11 is a block diagram showing a configuration on the transmitting side of an antenna system 3 included in a radio communication device 1 according to a fourth embodiment of the present invention.

The antenna system 3 of the present embodiment is a variant of the antenna system 3 of the third embodiment, and is composed of a passive antenna system configured to perform signal processing such as the splitting, phase adjustment, and combining of transmit signals, by digital signal processing.

Namely, the antenna system 3 of the present embodiment differs from the antenna system 3 of the third embodiment in that power amplifiers 18 are included in an analog signal processing portion 7 on the earlier stage side than an antenna 6. Therefore, the antenna 6 of the present embodiment is composed of only a plurality of antenna elements 9. Other respects are the same as those of the third embodiment.

Note that the analog signal processing portion 7 of the present embodiment is composed of digital-analog converters 11, up-converters 12, oscillator 13, and the power amplifiers 18, but may include at least the digital-analog converters 11 and the up-converters 12. Note also that a weighting matrix w of the present embodiment may be generated based on a DFT matrix, a Hadamard transform matrix, etc., in addition to a DCT matrix.

As described above, the radio communication device 1 of the present embodiment can also perform signal processing ranging from the splitting to combining of transmit signals generated by a baseband unit 2, by digital signal processing, and thus can perform high-level communication control compared to a case of performing the signal processing by analog signal processing.

<Others>

Note that the embodiments disclosed here are to be considered in all respects as illustrative and not restrictive. The scope of the present invention is indicated by the claims rather than by the above-described meaning, and all changes which come within the meaning and range of equivalency of the claims are therefore intended to be embraced therein.

REFERENCE SIGNS LIST

1: RADIO COMMUNICATION DEVICE
2: BASEBAND UNIT (BASEBAND PORTION)
3: ANTENNA SYSTEM
4: SIGNAL TRANSMISSION LINE
5: MAST
6: ANTENNA
7: ANALOG SIGNAL PROCESSING PORTION
9: ANTENNA ELEMENT
10: DIGITAL SIGNAL PROCESSING PORTION
11: DIGITAL-ANALOG CONVERTER
11*a*: DIGITAL-ANALOG CONVERTER
11*b*: DIGITAL ANALOG CONVERTER
12: UP-CONVERTER
12*a*: UP-CONVERTER
12*b*: UP-CONVERTER
13: OSCILLATOR
14: SPLITTER
14*a*: SPLITTER
14*b*: SPLITTER

15: VARIABLE ATTENUATOR
15a: FIRST VARIABLE ATTENUATOR
15b: SECOND VARIABLE ATTENUATOR
16: PHASE SHIFTER
16a: FIRST PHASE SHIFTER
16b: SECOND PHASE SHIFTER
17: COMBINER
18: POWER AMPLIFIER
21: BUTLER MATRIX CIRCUIT
22: 90 DEGREE HYBRID
23: 90 DEGREE HYBRID
24: 90 DEGREE HYBRID
25: 90 DEGREE HYBRID
26: −45 DEGREE PHASE SHIFTER
27: −45 DEGREE PHASE SHIFTER
28A: INPUT TERMINAL
28B: INPUT TERMINAL
28C: INPUT TERMINAL
28D: INPUT TERMINAL
29A: OUTPUT TERMINAL
29B: OUTPUT TERMINAL
29C: OUTPUT TERMINAL
29D: OUTPUT TERMINAL
30: CONTROL PORTION
31: SELECTING PORTION
32: DETERMINING PORTION
C: CELL (AREA)

The invention claimed is:

1. A radio communication device comprising:
an antenna including a plurality of antenna elements;
a signal processing portion that splits each of a plurality of transmit baseband signals destined for a same area, or a plurality of radio-frequency signals converted from the plurality of transmit baseband signals into signals for the respective plurality of antenna elements, performs at least one of gain adjustment and phase adjustment on each of the plurality of split signals, and then combines those of the plurality of split signals provided for each corresponding antenna element; and
a control portion that determines a weighting matrix and controls, based on an element of the determined weighting matrix, the signal processing portion so as to perform the at least one of the gain adjustment and the phase adjustment on each of the plurality of split signals.

2. The radio communication device according to claim 1, wherein
the signal processing portion includes:
a plurality of digital-analog converters, each converting a corresponding one of a plurality of digital transmit baseband signals to an analog transmit baseband signal;
a plurality of up-converters, each converting a corresponding one of the analog transmit baseband signals to a radio-frequency signal to form the plurality of radio-frequency signals;
a plurality of splitters, each splitting a corresponding one of the radio-frequency signals into signals for the respective plurality of antenna elements;
a plurality of phase shifters, each performing phase adjustment on a corresponding one of the split radio-frequency signals; and
a plurality of combiners, each combining the phase-adjusted radio-frequency signals provided for a corresponding one of the antenna elements,
the antenna further includes a plurality of amplifiers, each amplifying corresponding radio-frequency signals combined by a corresponding one of the combiners, and providing the amplified radio-frequency signals to the corresponding one of the antenna elements, and
the control portion, based on a corresponding element of the weighting matrix, individually controls the plurality of phase shifters so as to perform the phase adjustment.

3. The radio communication device according to claim 1, wherein
the signal processing portion includes:
a plurality of digital-analog converters, each converting a corresponding one of a plurality of digital transmit baseband signals to an analog transmit baseband signal;
a plurality of up-converters, each converting a corresponding one of the analog transmit baseband signals to a radio-frequency signal to form the plurality of radio-frequency signals;
a plurality of splitters, each splitting a corresponding one of the radio-frequency signals into signals for the respective plurality of antenna elements;
a plurality of phase shifters, each performing phase adjustment on a corresponding one of the split radio-frequency signals; and
a plurality of combiners, each combining the phase-adjusted radio-frequency signals provided for a corresponding one of the antenna elements,
the radio communication device further comprises a plurality of amplifiers, each amplifying a corresponding one of the plurality of radio-frequency signals, the plurality of amplifiers being provided on an earlier stage side than the antenna, and
the control portion, based on a corresponding element of the weighting matrix, individually controls the plurality of phase shifters so as to perform the phase adjustment.

4. The radio communication device according to claim 1, wherein in the weighting matrix, weight row vectors or weight column vectors are orthogonal to each other, the weight row vectors and the weight column vectors being provided for the respective plurality of transmit baseband signals.

5. The radio communication device according to claim 4, wherein the weighting matrix is generated based on a discrete cosine transform matrix.

6. The radio communication device according to claim 1, wherein,
the control portion includes:
a selecting portion that selects, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit baseband signals; and
a determining portion that determines, as the weight row vectors or the weight column vectors, weight candidates that satisfy desired communication quality from among the weight candidates selected by the selecting portion.

7. The radio communication device according to claim 5, wherein,
the control portion includes:
a selecting portion that selects, as candidates for weight row vectors or weight column vectors of the weighting matrix, a larger number of weight candidates than a number of the weight row vectors or the weight column vectors, based on tilt angles of beams to the area, the weight row vectors and the weight column vectors being provided for the respective plurality of transmit baseband signals; and a determining portion that determines, as the weight row vectors or the weight column vectors, weight candidates that satisfy desired communication quality from among the weight candidates selected by the selecting portion, wherein row vectors or column vectors of the discrete cosine transform matrix serve as the weight candidates to be selected by the selecting portion.

* * * * *